(12) United States Patent
Cowley et al.

(10) Patent No.: US 7,236,760 B2
(45) Date of Patent: Jun. 26, 2007

(54) TUNER FOR RECEPTION OF A BROADBAND RADIO FREQUENCY SIGNAL

(75) Inventors: Nicholas Paul Cowley, Wiltshire (GB); Peter Coe, Wiltshire (GB)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 10/834,369

(22) Filed: Apr. 29, 2004

(65) Prior Publication Data

US 2004/0266376 A1   Dec. 30, 2004

(30) Foreign Application Priority Data

May 7, 2003   (GB)   ................... 0310358.7

(51) Int. Cl.
*H04B 7/00* (2006.01)
*H04B 1/10* (2006.01)
(52) U.S. Cl. ................. 455/302; 455/260; 455/296
(58) Field of Classification Search ............ 455/260, 455/266, 265, 313, 318, 323, 302, 334, 337, 455/339, 340, 296, 3.02

See application file for complete search history.

(56) References Cited

U.S. PATENT DOCUMENTS

| | | | |
|---|---|---|---|
| 4,727,591 A | * | 2/1988 | Manlove .................. 455/182.2 |
| 5,575,001 A | * | 11/1996 | Ku .......................... 455/192.1 |
| 5,603,115 A | * | 2/1997 | Ku ............................. 455/254 |
| 5,949,832 A | | 9/1999 | Liebetreu et al. |
| 6,041,224 A | * | 3/2000 | Wada ......................... 455/327 |
| 6,856,794 B1 | * | 2/2005 | Tso et al. ................... 455/260 |
| 6,915,121 B2 | * | 7/2005 | Python et al. .............. 455/266 |
| 7,065,337 B2 | * | 6/2006 | Cowley et al. ............. 455/266 |
| 2004/0252196 A1 | * | 12/2004 | Englmeier .................. 348/192 |
| 2005/0024544 A1 | * | 2/2005 | Waight et al. ............. 348/731 |

FOREIGN PATENT DOCUMENTS

| | | |
|---|---|---|
| GB | 2 354 455 A | 1/2002 |
| GB | 2 367 700 A | 4/2002 |
| GB | 2360406 | 9/2002 |

OTHER PUBLICATIONS

Search Report under Section 17.

* cited by examiner

*Primary Examiner*—Sonny Trinh
(74) *Attorney, Agent, or Firm*—Blakely, Sokoloff, Taylor & Zafman LLP

(57) ABSTRACT

A tuner is provided for selecting a channel from a broadband radio frequency input signal containing a plurality of channels, such as a terrestrial broadcast signal. The tuner has an input which supplies the broadband signal to a filter. The output of the filter is connected to a mixer of a single frequency changer, which converts the selected channel to a predetermined non-zero intermediate frequency. The filter is a tracking radio frequency filter which tracks the frequency of the selected channel so as to attenuate the image channel. A controller receives from a demodulator a signal representing reception quality, such as bit error rate, and adjusts the tracking of the filter so as to achieve acceptable reception quality, such as an adequately low bit error rate. Alignment of the filter during manufacture is not, therefore, required.

13 Claims, 4 Drawing Sheets

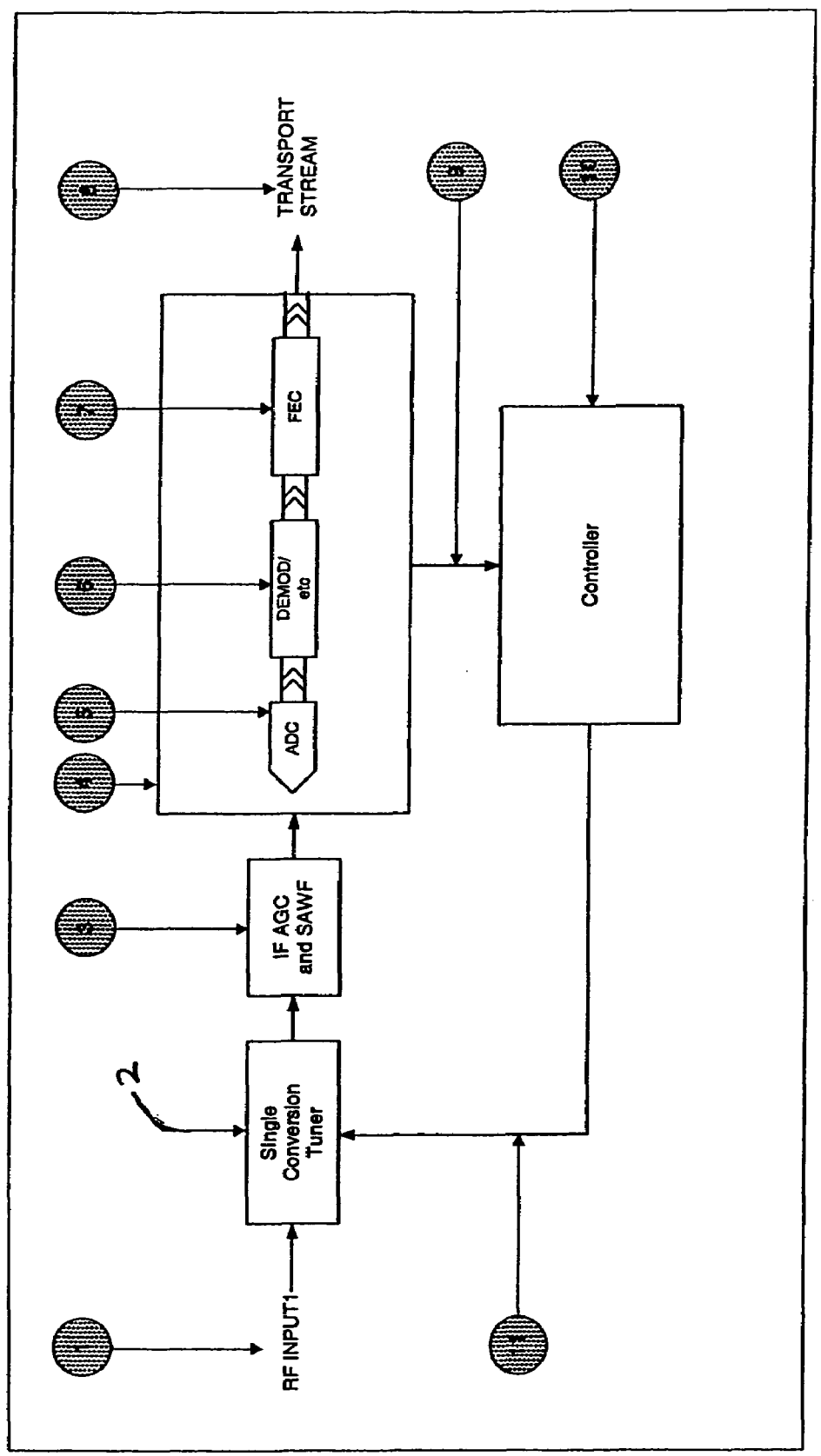
Figure (2)

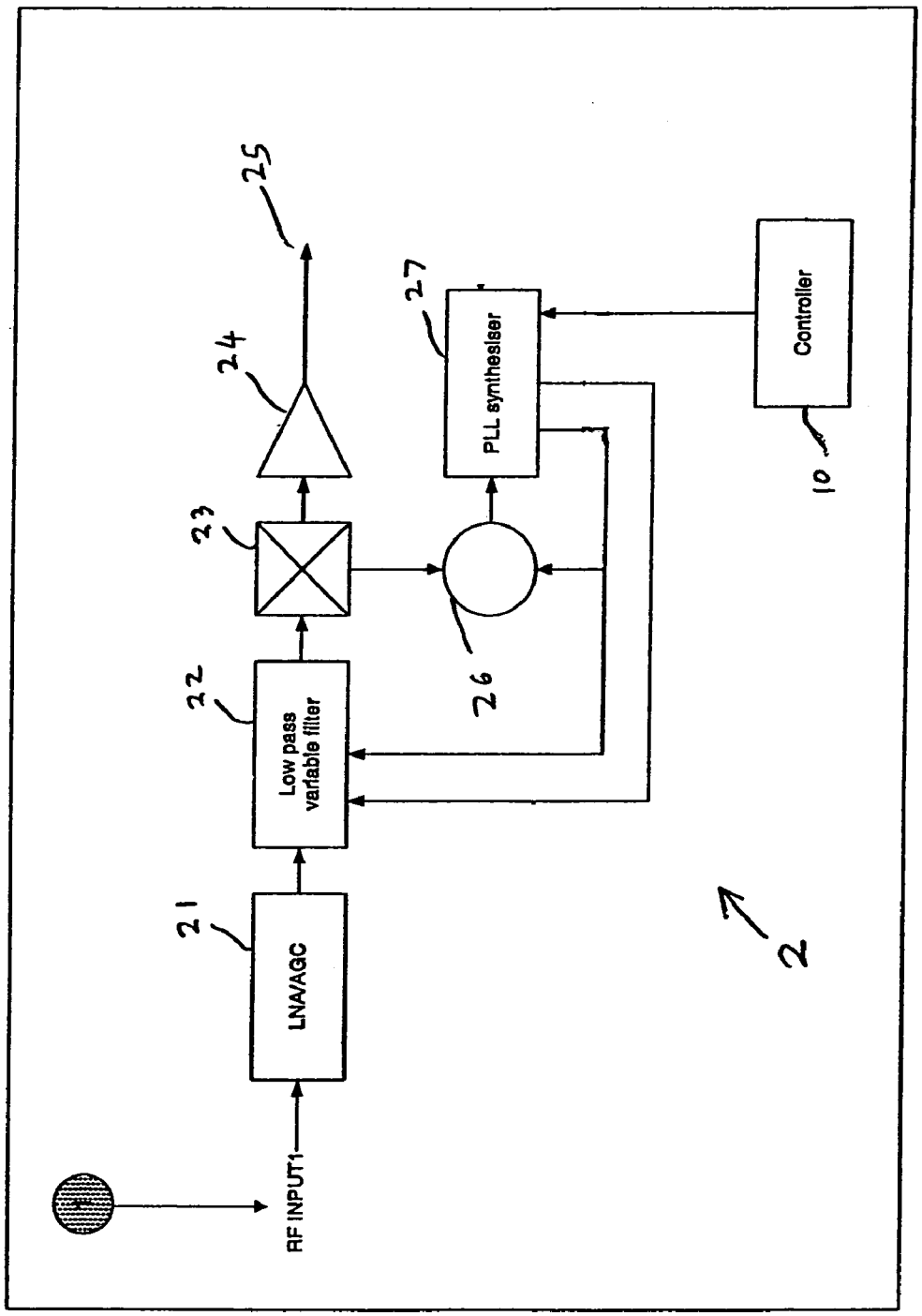
Figure (3)

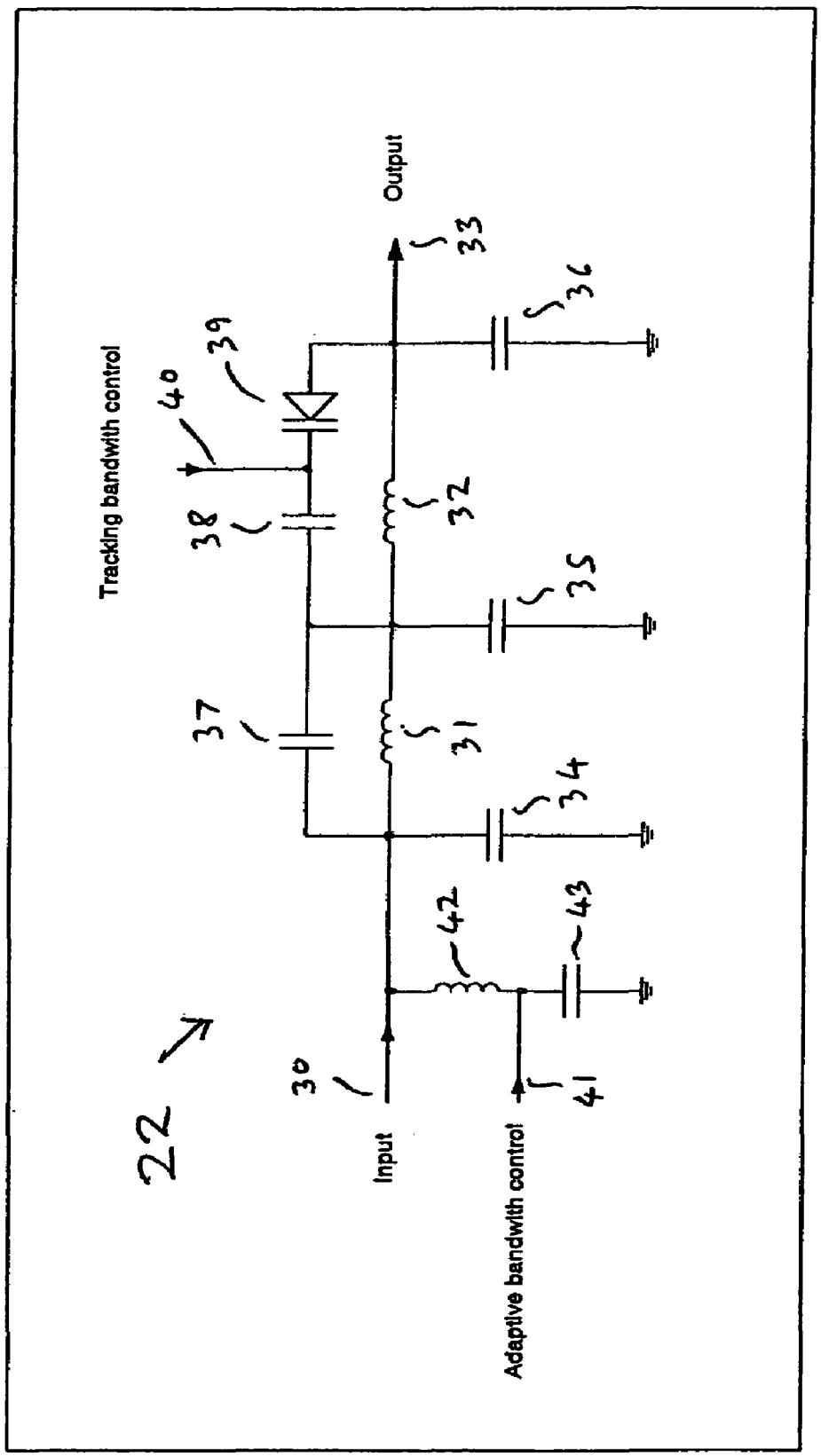
Figure (4)

TUNER FOR RECEPTION OF A BROADBAND RADIO FREQUENCY SIGNAL

TECHNICAL FIELD

The present invention relates to a tuner for selecting a channel from a broadband radio frequency input signal containing a plurality of channels. Such a tuner may be used for reception from a digital terrestrial aerial or from a cable distribution system or a satellite aerial system.

BACKGROUND

FIG. 1 of the accompanying drawings illustrates diagrammatically a known type of receiver arrangement for receiving digital terrestrial broadcast television signals and signals transmitted via digital cable systems. The receiver comprises a radio frequency (RF) input 1 connected to a single conversion tuner 2 for selecting a desired channel for reception and converting it to a non-zero intermediate frequency (IF). The output of the tuner 2 is connected to an IF stage 3, which provides variable gain in accordance with an automatic gain control (AGC) arrangement and channel filtering in the form of a surface acoustic wave filter (SAWF) for passing the selected channel at intermediate frequency and for attenuating other channels which may be present in the output of the tuner 2.

The output of the IF stage 3 is connected to a demodulator 4. The demodulator comprises an analog/digital converter (ADC) 5 which converts the selected channel at intermediate frequency to the digital domain. The output of the converter 5 is supplied to a demodulator block 6 which, in the case of coded orthogonal frequency division multiplex (COFDM) signals, principally comprises a demodulator and a fast Fourier transform (FFT) stage. The output of the demodulator 6 is supplied to a forward error correction (FEC) block 7 which performs the appropriate error correction, such as Reed Solomon or Viterbi correction. The demodulated error-corrected data are supplied, for example as an MPEG transport stream, to the output of the demodulator 4 for further processing by a baseband section (not shown) of the receiver.

The single frequency changer in the single conversion tuner 2 converts the selected channel to a standard non-zero intermediate frequency. In the case of digital terrestrial television receivers and digital cable receivers, three intermediate frequencies are in common use nowadays. 36 MHz is used, for example, for COFDM modulation in Europe. 44 MHz is used, for example, for VSB (vestigial sideband) modulation in USA. 57 MHz is used, for example, in Japan. In such receivers, it is necessary for adequate performance to be achieved in the presence of the image channel. It is usual for "high side mixing" to be employed, where the local oscillator frequency is above the desired channel. In this case, the image channel in the radio frequency domain will be at twice the intermediate frequency above the selected channel. For example, in the case of receivers with an intermediate frequency of 36 MHz, the image channel is 72 MHz above the selected channel. When translated to radio frequencies in the terrestrial television UHF band from 470 to 860 MHz, the frequencies affected by the image frequency are from 470 MHz to about 788 MHz. It is also possible in terrestrial transmission broadcasting for the image channel to have a substantially greater amplitude than the selected channel. The image channel may be as much as 46 dB or more above the selected channel. The image channel must therefore be suppressed to a level where it does not cause significant interference with the desired or selected channel and this is generally achieved by applying image filtering in the tuner 2.

In the case of known single conversion tuners such as 2, image suppression is achieved by the use of tracking RF filters between the input 1 and the frequency changer of the tuner 2. Such filters are typically of double-tuned type having a passband which is tuneable so as to be centred on a selected channel. Thus, the passband of the centre frequency is required to follow or "track" the frequency of a local oscillator of the frequency changer with an off-set such that the local oscillator frequency is greater than the centre frequency of the filter passband by the intermediate frequency in high-side mixing.

Tracking between the local oscillator frequency and the radio frequency filter passband centre frequency is achieved using suitably matched components such as varactor diodes within the local oscillator resonant network and the tracking filter. However, such components are subject to normal manufacturing tolerance spreads so that the filter and the local oscillator do not generally track acceptably across the transmitted frequency spectrum without an alignment step during manufacture. Accordingly, the resonant network and/or the filter includes at least one adjustable component which is aligned during manufacture so that the oscillator and filter frequencies vary as required to an acceptable tolerance when tuning across the transmitted spectrum. Typically, free standing wire wound or metal plate inductor elements ("air-coils") are used and alignment during manufacture involves mechanically adjusting such air-coils, for example changing the spacing between coils or plates or changing the mechanical dimensions of plates or coils from their original PCB (printed circuit board) assembled dimensions, so as to achieve acceptably accurate tracking of the local oscillator frequency by the image suppression filtering.

Such tuners are not attractive for implementation directly on to the main PCT (mother board) of a digital receiver because such mother boards are expensive and any mechanically adjustable component adds significant cost to the assembly and testing of the mother board. The production yield is reduced because of increased production test failure due to mechanical damage to the air coils by alignment operators or robots. It is also more difficult and expensive to service products with such mechanically adjustable air coils as this would require not only coil or plate replacement but also full mechanical re-alignment of the air coils using the entire mother board.

U.S. Pat. No. 5,949,832 discloses an arrangement for use in a digital data receiver for controlling the bandwidth of I and Q channel filters following frequency conversion of an input signal in a quadrature down-converter. The filters are referred to as Nyquist filters, which implies that the down-converter is of the zero intermediate frequency type and that the filters are low pass filters of controllable turnover frequency. The filter bandwidths are controlled so as to adapt to different data rates.

GB2364455 discloses the use of an active control loop for controlling the bias current of an input radio frequency amplifier to achieve an acceptable bit error rate.

GB2367700 discloses the concept of automatic alignment of tracking radio frequency filters without disclosing any technique for achieving this.

SUMMARY

According to the invention, there is provided a tuner for selecting a channel from a broadband radio frequency input signal containing a plurality of channels, comprising an input for receiving the input signal, at least one frequency changer for converting the selected channel to an intermediate frequency, a tracking radio frequency filter disposed between the input and the at least one frequency changer and arranged to track the frequency of the selected channel so as to attenuate the image channel, and a controller for receiving from a demodulator a signal representative of reception quality and for adjusting the tracking of the filter so as to achieve an acceptable reception quality.

The intermediate frequency may be a non-zero intermediate frequency.

The at least one frequency changer may comprise a single frequency changer.

The frequency changer or a first of the frequency changers may comprise an image reject mixer.

The signal representative of reception quality may be representative of bit error rate.

The tuner may comprise a demodulator.

The image channel may be above the selected channel and the filter may comprise a low pass filter of electronically controllable turnover frequency. As an alternative, the image channel may be below the selected channel and the filter may comprise a high pass filter of electronically controllable turnover frequency. As a further alternative, the filter may comprise a bandpass filter of electronically controllable passband centre frequency. As yet a further alternative, the filter may comprise a bandstop filter of electronically controllable bandstop centre frequency. The filter may be an elliptic filter.

The frequency changer or a first of the frequency changers may comprise a local oscillator controlled by a phase locked loop synthesiser. The synthesiser may be arranged to supply a frequency determining signal to the local oscillator and to the filter and to supply a frequency adjusting signal to the filter under control of the controller.

It is thus possible to provide a tuner having tracking radio frequency filtering for attenuating an image channel which does not require alignment during manufacture. Thus, it is not necessary to provide components which are adjustable for alignment, such as air-coils.

BRIEF DESCRIPTION OF THE DRAWINGS

FIG. 2 is a block schematic diagram of a receiver arrangement including a tuner constituting an embodiment of the invention;

FIG. 3 is a block diagram of the tuner of FIG. 2; and

FIG. 4 is a circuit diagram of a tracking filter of the tuner of FIG. 3.

Like reference numerals refer to like parts throughout the drawings.

DETAILED DESCRIPTION

Figure 1:
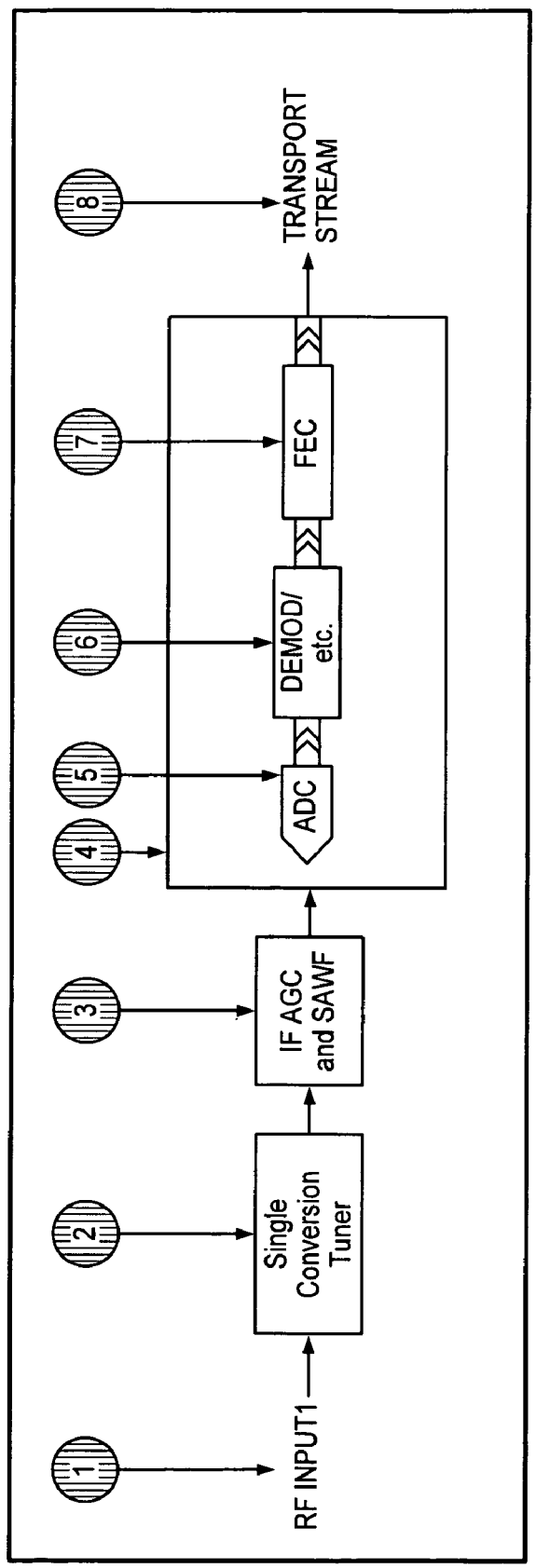
FIG. 1 is a block schematic diagram of a known receiver arrangement.

The tuner and receiver arrangement shown in FIG. 2 are of a similar type to that shown in FIG. 1, comprising a single conversion tuner 2, an IF stage 3 and a demodulator 4. However, the tuner 2 differs from that shown in FIG. 1 in that the radio frequency filter between the input 1 and the frequency changer of the tuner 2 is electronically adjustable in addition to tracking the local oscillator frequency so as to adjust the tracking during operation. Also, the demodulator 4 of FIG. 2 produces a signal representative of the bit error rate (BER) and this is supplied at 9 to a controller 10 for adjusting the tracking of the radio frequency filter. Demodulators for providing bit error rate estimations are well known in the technical field and will therefore not be described further.

During operation of the tuner, when a channel is selected for reception, it is converted by the tuner 2 to the intermediate frequency and processed by the IF stage 3 and the demodulator 4. The demodulator 4 produces the BER estimation and supplies this to the controller 10. The controller 10 performs an algorithm, for example for comparing the BER with an acceptable value and supplying an adjustment signal indicated at 11 to the radio frequency filter of the tuner 2 so as to vary the tracking until an acceptable BER is achieved.

The controller 10 may be embodied in the form of software within a system micro controller of the receiver. However, other implementations are possible and, for example, the controller may be embodied by a state machine or the like, for example within the demodulator 4. No alignment of the radio frequency filter is required during manufacture and the tuner 2 may be made of components, such as surface mount components, suitable for mounting on a motherboard.

The tuner 2 is shown in more detail in FIG. 3. This particular tuner is of the single conversion type and is primarily intended for receiving digital terrestrial broadcast television signals but could be used for other terrestrial broadcast signals or for receiving signals distributed by other means, such as by cable distribution or satellite transmission. The RF input 1 is connected to an input stage 21 comprising a low noise amplifier (LNA) including an automatic gain control (AGC) arrangement. The LNA has a wide dynamic range input capability and the AGC is arranged to reduce the variation in signal level and to supply a suitable level to the following circuitry. The stage 21 may incorporate broadband radio frequency filtering, such as highpass and lowpass fixed filters for attenuating signals outside the desired broadband spectrum.

The output of the stage 21 is supplied to a variable filter or array of filters 22, which is shown as a low pass filter for high side mixing and whose purpose is to pass the selected channel while attenuating the image channel. As alternatives, the filter or array 22 may comprise a variable high pass filter for low side mixing, a variable bandpass filter or a variable bandstop filter. The turnover frequency of the filter 22 is variable and is controlled to track the local oscillator frequency of the tuner and to adjust the tracking to achieve an acceptable BER.

The output of the filter 22 is supplied to an image reject mixer 23, for instance of known type. The mixer 23 provides additional attenuation of the image channel and allows the image rejection performance requirements of the filter 22 to be reduced. The mixer 23 converts the selected channel to the intermediate frequency such as 36 or 44 MHz depending on the modulation standard of the selected channel. The resulting intermediate frequency signal is supplied to an intermediate frequency amplifier 24, whose output is connected to the output 25 of the tuner.

The mixer 23 forms part of a frequency changer which also comprises a local oscillator 26 controlled by a phase locked loop (PLL) synthesiser 27. The synthesiser 27 receives control signals from the controller 10 for selecting the desired channel for reception and for adjusting the tracking of the filter 22 to achieve acceptable performance. In the tuner illustrated in FIG. 3, the frequency changer is of the high-side type in which the synthesiser 27 controls the local oscillator 26 to supply to the mixer 23 a local oscillator signal having a frequency which is greater than the frequency of the desired channel by an amount equal to the intermediate frequency so that the image channel has a frequency which is higher than the frequency of the selected channel by twice the intermediate frequency.

When a user selects a channel for reception, the controller 10 supplies the appropriate data to the synthesiser 27 so as to tune the local oscillator 26 to the correct frequency. The same control signal is supplied to the filter 22 so that the turnover frequency of the filter 22 approximately tracks the frequency of the local oscillator 26, optionally with a nominal offset depending on the type of filter being used. As described hereinbefore, the controller 10 monitors the bit error rate from the demodulator 4 and adjusts the tracking of the filter 22 so as to vary the turnover frequency until an acceptable bit error rate is achieved.

FIG. 4 shows an example of a fifth order elliptic lowpass filter which is suitable as the filter 22. The filter comprises an input 30 connected via inductors 31 and 32 to a filter output 33. The input 30 is connected to ground via a capacitor 34. The connection between the inductors 31 and 32 is connected to ground via a capacitor 35. The output 33 is connected to ground via a capacitor 36. A capacitor 37 is connected in parallel with the inductor 31. A series circuit comprising a capacitor 38 and a variable capacitance or varactor diode 39 is connected in parallel with the inductor 32.

A "tracking bandwidth control" signal is supplied to a first control input 40 of the filter which is connected to the connection between the capacitor 38 and the varactor diode 39. The tracking bandwidth control signal is supplied by the synthesiser 27 to cause the turnover frequency of the filter 22 to track the frequency of the local oscillator 26. An "adaptive bandwidth control" signal is supplied to a second control input 41, which is connected to the connection between an inductor 42 and a capacitor 43, connected in series between the input 30 and ground. The input 41 receives a control signal from the synthesiser 27 for adjusting the tracking as described hereinbefore. The inductor 42 and the capacitor 43 decouple the control signal from the filter so as not to affect the filtering operation. The adaptive bandwidth control signal is supplied via the inductors 42, 31 and 32 to the anode of the varactor diode 39 whereas the main tracking bandwidth control signal is supplied to the cathode of the varactor diode 39.

The polarities of the tracking and adaptive control signals are such as to reverse-bias the diode 39, whose capacitance is dependent on the actual reverse-bias voltage. The tracking bandwidth control signal acts as a bias voltage for the diode 39 whereas the adaptive bandwidth control signal acts as a reference voltage for the diode 39. Thus, the tracking bandwidth control signal nominally tunes the filter 22 so as to pass the selected channel with relatively little attenuation and so as to attenuate the image channel. The adaptive bandwidth control signal adjusts the tracking in accordance with the measured or estimated bit error rate so as to achieve an acceptable error rate. Although this may result in the selected channel being significantly attenuated, adequate reception performance is achieved provided the thermal noise in the selected channel is sufficiently low.

What is claimed is:

1. A tuner for selecting a channel from a broadband radio frequency input signal containing a plurality of channels, comprising:
   an input for receiving said input signal;
   at least one frequency changer for converting said selected channel to an intermediate frequency;
   a tracking radio frequency filter disposed between said input and said at least one frequency changer and arranged to track a frequency of said selected channel so as to attenuate an image channel; and
   a controller for receiving from a demodulator a signal indicating a bit error rate and for adjusting tracking of said filter so as to vary a turnover frequency until an acceptable bit error rate is achieved.

2. A tuner as claimed in claim 1, in which said intermediate frequency is a non-zero intermediate frequency.

3. A tuner as claimed in claim 1, in which said at least one frequency changer comprises a single frequency changer.

4. A tuner as claimed in claim 1, in which said at least one frequency changer comprises an image reject mixer.

5. A tuner as claimed in claim 1, in which said signal representative of reception quality is representative of a bit error rate.

6. A tuner as claimed in claim 1, comprising said demodulator.

7. A tuner as claimed in claim 1, in which said image channel is above said selected channel and said filter comprises a lowpass filter of electronically controllable turnover frequency.

8. A tuner as claimed in claim 1, in which said image channel is below said selected channel and said filter comprises a highpass filter of electronically controllable turnover frequency.

9. A tuner as claimed in claim 1, in which said filter comprises a bandpass filter of electronically controllable passband centre frequency.

10. A tuner as claimed in claim 1, in which said filter comprises a bandstop filter of electronically controllable bandstop centre frequency.

11. A tuner as claimed in claim 1, in which said filter is an elliptic filter.

12. A tuner as claimed in claim 1, in which said at least one frequency changer comprises a local oscillator controlled by a phase locked loop synthesiser.

13. A tuner as claimed in claim 12, in which said synthesiser is arranged to supply a frequency determining signal to said local oscillator and to said filter and to supply a frequency adjusting signal to said filter under control of said controller.

* * * * *